United States Patent [19]

Sullivan

[11] Patent Number: 4,910,495
[45] Date of Patent: Mar. 20, 1990

[54] DIPSTICK WITH AUTOMATIC WARNING DEVICE

[76] Inventor: James M. Sullivan, P.O. Box 63, Butte, Mont. 59703

[21] Appl. No.: 268,728

[22] Filed: Nov. 7, 1988

[51] Int. Cl.$^4$ ............................................. G08G 23/00
[52] U.S. Cl. ................................. 340/450; 340/450.3
[58] Field of Search .................. 340/450.3, 450, 623; 73/308, 313; 200/84 R, 84 C

[56] References Cited

U.S. PATENT DOCUMENTS

| | | | |
|---|---|---|---|
| 1,768,446 | 6/1930 | Gron | 200/84 R |
| 2,661,411 | 12/1953 | Berger | 200/84 R |
| 2,780,692 | 2/1957 | Hinojosa | 200/84 R |
| 2,855,582 | 10/1958 | Tweedale | 340/450 |
| 3,728,704 | 4/1973 | Moore | 340/450.3 X |
| 4,386,337 | 5/1953 | Todd | 340/450.3 X |
| 4,721,941 | 1/1988 | Robine, Jr. et al. | 340/450.3 |

Primary Examiner—Joseph A. Orsino
Assistant Examiner—Brian R. Tumm
Attorney, Agent, or Firm—Eric P. Schellin

[57] ABSTRACT

A dipstick with automatic warning device consisting of a tube positioned in a dipstick housing of an oil pan, indicia disposed on the tube indicating ADD and FILL of the oil pan, sets of elecrical contacts disposed internally of the tube, one set proximate the ADD indicia and one set proximate the FULL indicia. A plastic cap located below the ADD indicia and having a bore therethrough for passage of oil from the oil pan cap internal of lower end of the tube. A conductive float ball within the tube to bridge respective sets of electrical contacts. An iron element in the float ball rendering a magnetic sensitive component thereof, a magnet disposed in the cap providing magnetic force to assure contac of the float ball and the set of contacts proximate the ADD indicia when level of oil is sufficiently low, an upper cap closing off the upper end of the tube, a 4-wire phone jack disposed in the upper cap for coupling with a 4-wire phone plug, and a communications member for coupling the respective ones of the sets of electrical contacts to respective ones of terminals of the 4-wire phone jack.

6 Claims, 1 Drawing Sheet

DIPSTICK WITH AUTOMATIC WARNING DEVICE

BACKGROUND OF THE INVENTION

1. Field of the Invention

The invention relates to an improved customized removable dip stick having an arrangement of electrically and magnetically impacting float switches, one set for an upper location level and another set for a lower most location level; an alarm or light responds to sensing of an absence of fluid at the lower most level.

The invention relates further to a dipstick with automatic warning device consisting of an elastomeric hollow tube constructed and arranged to adapt within an inner contour and configuration of a dipstick housing for an oil pan of an internal combustion engine or for an automatic transmission unit, and having an upper end and a lower end thereof, indicia disposed externally on the elastomeric tube generally indicating ADD and FULL and the like conditions of a fluid such as oil in the oil pan, or oil in the automatic transmission, sets of flanged element electrical contact means disposed internally of the elastomeric tube, one set proximate the ADD indicia and one set proximate the FULL indicia, a plastic cap generally located lower and adjacent below the ADD indicia and having a generally medially disposed passway extending therethrough for passage of oil from the oil pan or transmission reservoir, a threaded coupling about a peripherial edge of the lower plastic cap for threadedly engaging with a threaded coupling on an internal surface at the lower end of the elastomeric tube, a conductive float ball disposed within the elastomeric tube and of sufficient diameter to bridge respective sets of electrical contacts at the flanged element thereof, a ferrous constituency disposed in the float ball means rendering a magnetic sensitive component thereof, a magnet element disposed in the lower plastic cap providing mild magnetic force to assure positive contact of the float ball and the set of contacts proximate the ADD indicia when level of oil is sufficiently low for determining a reading of the ADD indicia, an upper cap closing off the upper end of the elastomeric tube, a 4-wire phone jack disposed in the upper cap for coupling with a 4-wire phone plug, and a communications member for couping the respective ones of the sets of electrical contacts to respective ones of terminals of the 4-wire phone jack, thereof as more particularly described herein.

DESCRIPTION OF THE PRIOR ART

Various prior art composite dipstick automatic warning devices, and the like, as well as apparatus and method of their construction in general, are found to be known, and exemplary of the U.S. prior art are the following:

| | |
|---|---|
| 696,280 | Tauber |
| 912,970 | Marsh |
| 1,243,470 | White |
| 1,768,446 | Gron |
| 2,677,816 | Quist |
| 2,744,177 | Barber |
| 2,824,187 | Fanning |
| 3,391,367 | Messick |
| 3,817,274 | Anderson |
| 4,144,757 | Mauboussin |
| 4,386,337 | Todd |

-continued

| | |
|---|---|
| 4,473,730 | Ida |

Todd discloses a device for sensing a level of oil in the oil pan which sensing device energizes an electric lamp when the sensed level is low. U.S. Pat. No. 3,817,274 shows a magnetic float that closes a switch.

These patents or known prior uses teach and disclose various types of dipstick automatic warning devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide a novel and customized, composite dipstick with automatic warning device for indicating by a light or other means the presence of a low level of oil in an oil pan or the fluid in an automatic transmission of an internal combustion engine. The invention also provides a method by which an excess of oil is also indicated by a presence of a high level of oil therein which is indicated by the warning light or other means.

Another object of the invention is directed further to a device providing a portable and removable dipstick construction that is constructed to include circuitry and mechanical actuable members that are uniquely cooperable to determine conditions of oil level(s) in an oil pan or automatic transmission, and which include magnetic elements to provide positive action of the components to establish a state of stability of the condition of the level to be indicated.

The invention involves, but is not restricted to a combination of proper assortment of materials including a 4-wire phone jack and plug arrangement or like system of electrical coupling for communicating the level conditions to an indicator position convenient to an operator in the operator position.

An object of the invention is to provide a composite dipstick that still provides conventional indications of oil level(s) as well as provide a combination of circuitry elements that provide automatic indication of the oil levels.

An additional object of the invention is to provide better, stronger, longer lasting, virtually maintenance free kind of dipstick construction that is adaptable to generally universal use and application.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF A PREFERRED EMBODIMENT OF THE INVENTION

Figure 1:
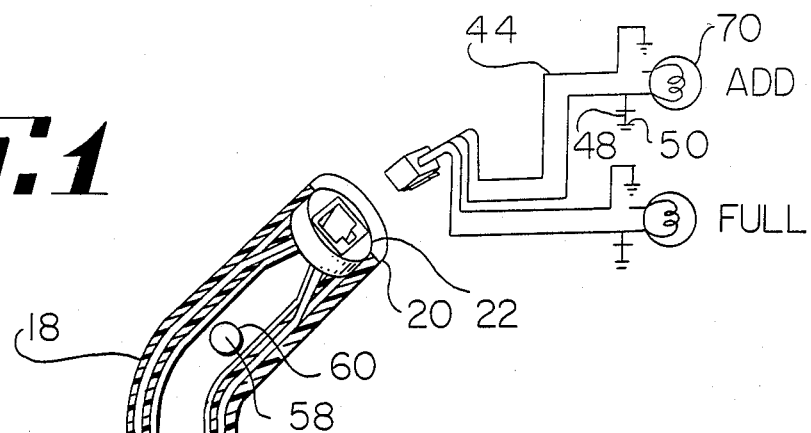
FIG. 1 is an elevational and perspective view of a dipstick with an automatic warning device fitting into a tubular shaped access member for adding fluid and which is connected to an oil pan or automatic transmission, according to a preferred embodiment and best mode of the invention.
Figure 2:
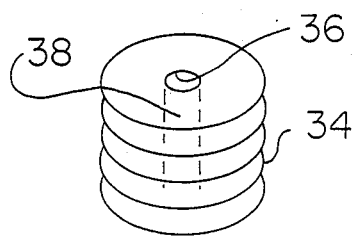
FIG. 2 is a side view taken along lines 2—2 of FIG. 1 showing a cap used in closing off the top opening of the tubular shaped access member.

Referring now to the drawings there is shown in FIG. 1 a hollow dipstick 10 with an automatic warning device 12 fitting into a tubular shaped access member 14 for adding oil and which is connected to an oil pan or automatic transmission (not shown) containing a fluid 16 such as oil. The tubular shaped access member 14 includes an elbow or curved portion 18 disposed about an upper are of thereof, and at the upper distal end 20 of the tubular shaped access member 14 is a cylindrical opening 22 capable of being closed off by a cap 24 shown in FIG. 2 that is received on the distal end 20 in an usual manner. The cap 24 fits onto the tubular shaped access member 14 at the distal end 20 so as to create a tight closure and tend to allow creation or formation of a vacuum to be present in the dipstick 10. The dipstick 10 is generally hollow and is constructed of a heat resistive plastomeric or elastomeric material adapted or adaptable to fittingly engage within the tubular member 14.

Figure 3:
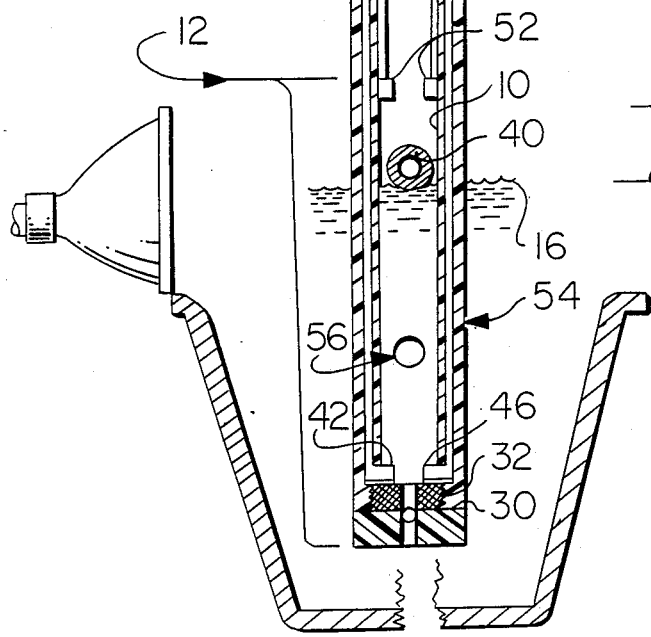
FIG. 3 is an enlarged and perspective view taken along lines 3—3 of FIG. 1 showing an annular and flanged member for closing off the lower end of the tubular shaped access member and yet having a passway for allowing oil to pass therethrough.

At a lower distal end 30 of the tubular member 14 is a cylindrical opening 32 capable of being generally closed off by a metal or plastic cap 34, shown in FIG. 3, for securably engaging the inner surface of the lower distal end 30, the metal or plastic cap 34 being provided with a centrally disposed aperture 36 therein for allowing impeded passage of the oil or fluid 16 from flushing through and into the tubular member 14 and into the hollow are of the dipstick 10. The aperture 36 is spanned by a screen 38 mounted and securably held in the metal or plastic cap 34 and the screen 38 may be of plastic such as Nylon ®, Teflon ® or the like. Imbedded in the metal or plastic cap 34 is a ferrous constituency or magnetic element therein (not shown) for providing a magnetic force to insure contact with an iron or magnetic responsive material comprised in a float or hollow ball 40 that capable of bridging circuit elements and is thusly urged against flanged shaped contact 42 connected to a positive terminal 44 of a control circuit and flanged contact 46 connected to a ground or negative terminal 48 of the control circuit. The connections 42-44 and 46-48 of the control circuit are conductors adapted to be embedded in the plastomeric or elastomeric metarial of the hollow dipstick 10. Ground connection of the negative terminal 48 may be connected to a convenient ground point 50 of the engine (not shown).

The hollow ball 40 rides on the fluid 16 as is known and when the fluid 16 drops to a low level and adjacent contacts 42 and 46, the control circuit is closed to allow passage of electricity. To prevent the hollow ball 40 from riding too high, two flanges 52 are inserted as shown to stop or impede and prevent the hollow ball from going too far up the dipstick on removal of the dipstick 10 for visual calibration or for separately adding fluid 16. Separate connections and contacts are capable of being applied here to separately energize a light (not shown) to accordingly warn a motorist that there is too much fluid in the reservoir which could blow a seal gasket on the oil pan or transmission (not shown). A ferrous constituency or the magnetic material of the metal or plastic cap 34 and in the float ball 40 renders a magnetic sensitive component thereof. The magnet element disposed in the lower plastic cap 34 provides a mild magnetic force to assure positive contact of the float ball and the set of contacts proximate the ADD indicia when the level of oil is sufficiently low for determining a reading of the ADD indicia.

A marker line 54 or line(s) surrounding the generally cylindrical hollow dipstick 10 is disposed to designate visualization of a full or like quantification of the fluid 16 in the oil pan or transmission reservoir when the dipstick 10 is removed from the tubular member 14 for checking or confirming the level of the fluid 16.

A small hole 56 is a hole that is bored in the dipstick 10 at a point near where the add fluid marker line 54, or even a distance below thereof; the purpose of the hole 56 is to provide an anti-vacuum condition so the ball 40 is dropped suddenly so as to create a more stimulating contact at points of contacts 42-46 once the fluid 16 reaches below the level of the hole 56, and the vacuum inside the cylinder body of the dipstick 10 becomes effectual, thus dropping the hollow ball 40 with a gravitational force.

A rubber plug 58 filling a hole 60 is disposed on an integrally constructed hinge (not shown) and has to be opened from the hole 60 after removing the dipstick 10 for visual inspection or on adding to the fluid 16 for the reason to make sure a vacuum is out of the dipstick 10 when reinserting the dipstick 10 into the tubular member 14 and upon it entering the fluid 16 in the reservoir of the oil pan or automatic transmission so the inner portion of the dipstick will fill to the same level as the outer reservoir of fluid 16, a few seconds usually is required for this interval and then the plug 58 is inserted to its former position in the dipstick 10 which reseals the vacuum within the dipstick 10.

A warning light 70 is connected to turn on when the contacts 42-46 are closed by the hollow ball 40 resting on the contacts 42-46 and retained there by the magnetic force of the metal cap 34 asserting forces to maintain the contacts 42-46 closed, thus indicating the low level condition of the fluid 16. The warning light 70 is mounted on the dash board or other convenient observable location in the cab or otherwise proximate the operator's position.

A 4-wire phone jack may be disposed in the upper cap for coupling with a 4-wire phone plug, and a communications member for couping the respective ones of the sets of electrical contacts to respective ones of terminals of 4-wire phone jack.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters patent is:

1. A dipstick with automatic warning device comprising
    an elastomeric hollow tube constructed and arranged to adapt within an inner contour and configuration of a dipstick housing for an oil pan or automatic transmission of an internal combustion engine and having an upper end and a lower end thereof, indicia disposed externally on the elastomeric tube generally indicating ADD and FULL and the like conditions of a fluid such as oil in the oil pan or automatic transmission, sets of flanged element electrical contact means disposed internally of the elastomeric tube, one set proximate the ADD indicia and one set proximate the FULL indicia, a plastic cap generally located lower and adjacently below the ADD indicia and having a generally medially disposed passway extending therethrough for passage of oil from the oil pan, a threaded coupling about a peripheral edge of the lower plastic cap for threadedly engaging with a threaded coupling on an internal surface at the lower end of the elastomeric tube, a conductive float ball means disposed within the elastomeric tube and of sufficient diameter to bridge respective sets of electrical contact means at the flanged element thereof, a ferrous constituency means disposed in the float ball means rendering a magnetic sensitive component thereof, a magnet element disposed in the lower plastic cap providing mild magnetic force to assure positive contact of the float ball means and the set of contact means proximate the ADD indicia when level of oil is sufficiently low for determining a reading of the ADD indicia, an upper cap closing off the upper end of the elastomeric tube, means including a 4-wire phone jack disposed in the upper cap for coupling with a 4-wire phone plug, and communications means for coupling the respective ones of the sets of electrical contact means to respective ones of terminals of the 4-wire phone jack.

2. The apparatus of claim 1 wherein the lower cap has a filter screen disposed across the passway.

3. The apparatus of claim 1 wherein the elastomeric hollow tube has an angular bend or elbow therein of approximately 45° so the plastic tube generally conforms to the inner contour and configuration of the dipstick housing.

4. The apparatus of claim 1 wherein a small hole in the elastomeric tube allows pressure equalization within the elastomeric tube so the floating ball means rides on the oil and follows gravitational pull along a length of the elastomeric tube.

5. The apparatus of claim 1 wherein the communications means are wires embedded within and along a length of the elastomeric tube.

6. The apparatus of claim 1 wherein the 4-wire phone plug is coupled to indicator warning light means including an ADD indicator light and a FULL indicator light means coupled to the respective set of the contact means ADD indicia and the FULL indicia, respectively.

* * * * *